UNITED STATES PATENT OFFICE.

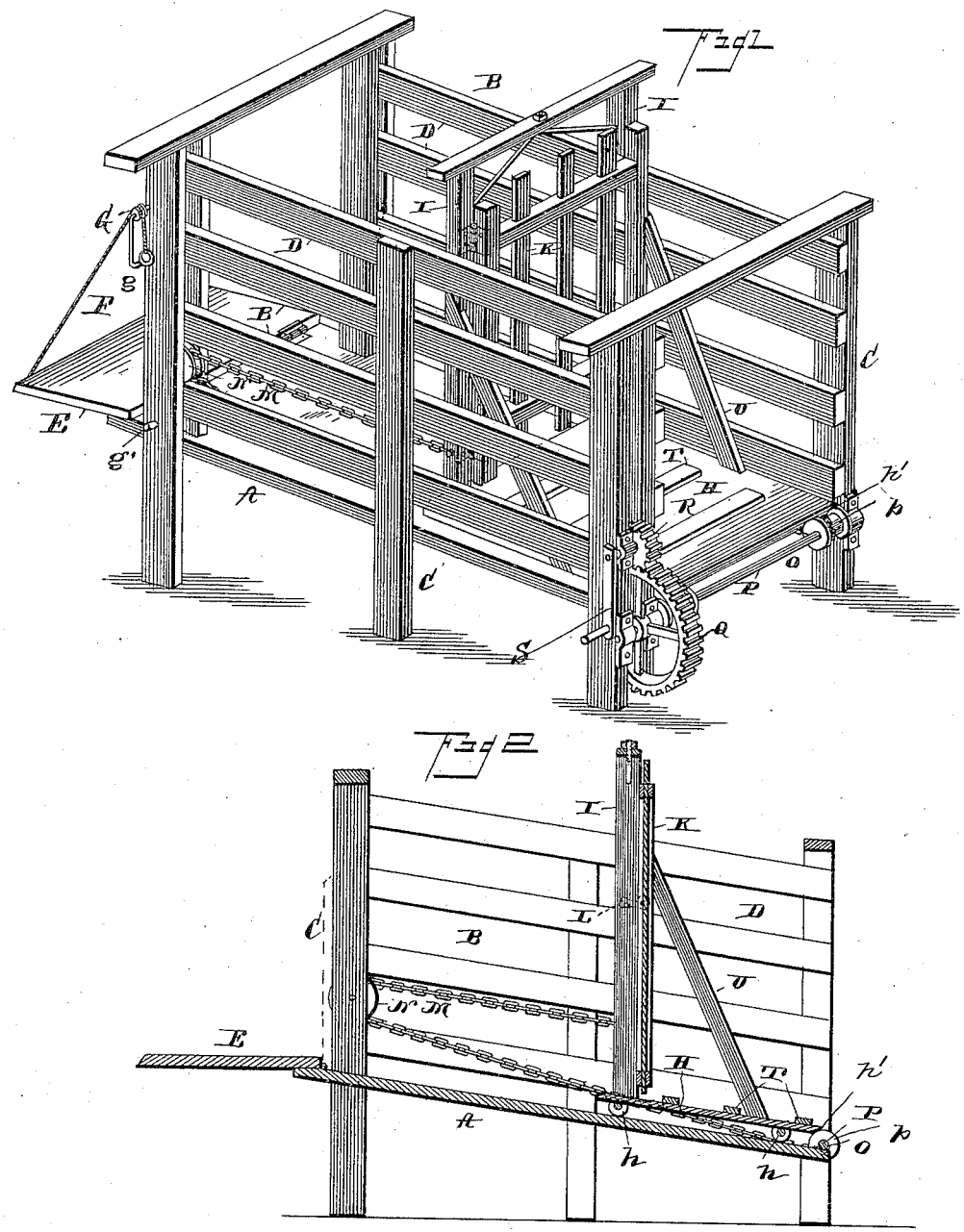

JAMES W. McIVER AND JOHN NATHANIEL McIVER, OF HOUSTON, TEXAS.

GANGWAY FOR LOADING OR UNLOADING STOCK-CARS.

SPECIFICATION forming part of Letters Patent No. 409,222, dated August 20, 1889.

Application filed March 13, 1889. Serial No. 303,089. (No model.)

*To all whom it may concern:*

Be it known that we, JAMES W. McIVER and JOHN NATHANIEL McIVER, citizens of the United States, residing at Houston, in the county of Harris and State of Texas, have invented new and useful Improvements in Gangways for Loading or Unloading Stock-Cars, of which the following is a specification.

Our invention relates to a car-loader which is designed to facilitate the loading of cars with cattle and all kinds of stock; and it consists in a certain novel construction and combination of devices, fully described hereinafter in connection with the drawings, and specifically pointed out in the claims.

In the drawings, Figure 1 is a perspective view of the loader. Fig. 2 is a longitudinal sectional view of the same.

Referring by letter to the drawings, A designates an inclined chute or way, having the sides B B, which are preferably formed by the vertical posts C C and the longitudinal rails D D, but may be formed in any other suitable way, the lower ends of the said posts being designed to rest on the ground, and thereby support the chute or way in the proper position. The lower end of the chute or way is arranged close to the ground, so as to enable cattle to step thereon from the ground or from the pen (not shown) in which they may be confined, and the upper end of the chute or way is arranged on the level of the car-floor. A folding platform or leaf E is hinged to the upper end of the chute or way, and is adapted to be let down to rest on the floor of the car, and thereby bridge the space between the upper end of the chute and the car, and a cord or chain F extends from the free end of this platform or leaf over the pulley G on the side of the chute or way, and is provided with a ring $g$, which is adapted to be engaged with a pin or hook $g'$ to hold the platform or leaf in its raised position, which is indicated in dotted lines in Fig. 2.

H designates a sliding platform which is arranged on the chute or way, and is provided with rollers $h\ h$ to bear thereon, and between suitable vertical posts I I, near the upper end of the said platform, is arranged the swinging gate K, which swings open to receive the cattle or other stock, and is provided with a suitable latch or hook L to secure it in the closed position.

Draft-chains M M are connected to the sliding platform or the vertical posts thereon, and, after passing around suitable pulleys N N at the upper end of the chute or way, are connected at their free ends to a winch O at the lower end of the chute or way. This winch consists, preferably, of a transverse revoluble shaft P, journaled in bearings at the lower ends of the chute or way, and provided with drums or spools $p\ p$ to wind the chains, the gear-wheel Q, keyed to one end of the shaft, and the pinion R, meshing with the gear-wheel and provided with a crank-arm S.

When cattle are to be loaded on a car, the sliding platform and the movable gate which is carried thereby are drawn down to the lower end of the chute or way, the gate is opened, and the cattle in sufficient number to fill a car are driven in. The gate is now closed to prevent the escape of the cattle, and the winch is turned, thereby drawing the gate up the chute or way until the cattle are forced into the car.

It will be observed that by locating the gate at the front end of the platform H, when said gate is at the rear end of the frame or over the winch, the rear end of the platform will have passed over the rolls $p\ p$ and fallen to the ground, thus forming an inclined plane up which the cattle can easily travel to the trap. For the purpose of preventing the cattle from slipping, cleats T may be arranged upon the platform at suitable distances apart. When the gate is closed and the winch operated, the platform is advanced, the same riding over the rollers $p\ p$, which are rotated in the direction of the moving platform.

For the above reason the platform H is mounted slightly higher than the rollers $p\ p$, and has its rear end chamfered, as at $n'$, so as to readily take over the rollers.

The frame-work of the loader is braced and strengthened in any suitable manner, and inclined braces U U are arranged on the platform to prevent the gate from being pressed out of position by the cattle; but this construction forms no essential part of the invention, as it may be varied according to the requirements of the case and the judgment of the constructer.

Having thus described the invention, we claim—

1. The combination, in an animal-trap having an inclined bottom and opposite sides, of a winch journaled at one end thereof, a movable platform mounted on the bottom and provided with opposite posts at its front end, a gate hinged to one of said posts, and opposite chains connected to the winch at one end and passing over drums located at the opposite ends of the sides, the opposite terminals of the chains being connected to the opposite posts, substantially as specified.

2. The combination, with the opposite side frames B and the bottom A, mounted between the same, of the winch, consisting of the shaft P, journaled in the rear ends of the frames and provided with the drums $p\ p$ and gear Q, the pinion R, and the drums N, mounted at the opposite end of the frame, the platform H, provided with rollers $n$, mounted for movement on the floor, and the posts I, extending vertically at the opposite sides and at the front end of the platform, the gate K, pivoted to one post and closing between the posts, and the chains M, having one of their ends connected with the drums $p$ and passed over the drums N and connected with one of the posts I, substantially as specified.

3. The animal-gangway having the inclined bottom and opposite sides, in combination with a movable platform mounted on the bottom and provided with posts, a gate hinged to the posts, said platform being designed to drop down at one end of the trap and form an inclined plane, up which the animals can walk, and the operating means to move the platform and gate along the bottom of the gangway, substantially as specified.

In testimony that we claim the foregoing as our own we have hereto affixed our signatures in presence of two witnesses.

JAMES W. McIVER.
JOHN NATHANIEL McIVER.

Witnesses:
MAX HART,
C. GRUMBACH.